F. B. WILDMAN & G. L. BALLARD.
PATTERN MECHANISM FOR KNITTING MACHINES.
APPLICATION FILED JUNE 4, 1913.

1,172,090.

Patented Feb. 15, 1916.
5 SHEETS—SHEET 1.

Attest:
Ed L. Tolson
H. L. Alden

Inventors:
Frank B. Wildman,
George L. Ballard,
by Spear, Middleton, Donaldson & Spear
Attys

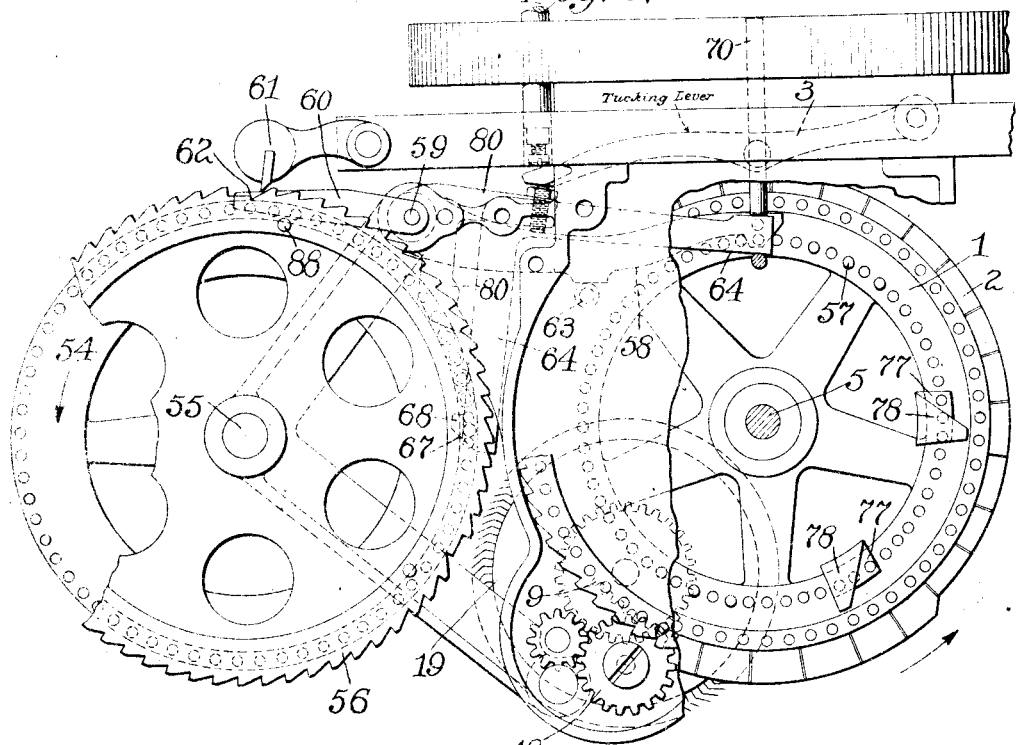
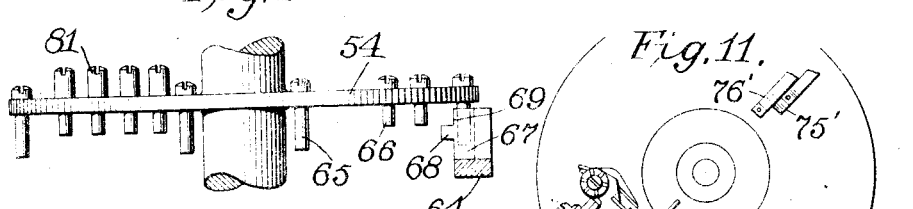
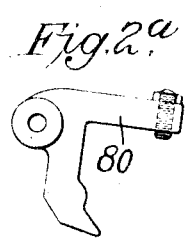
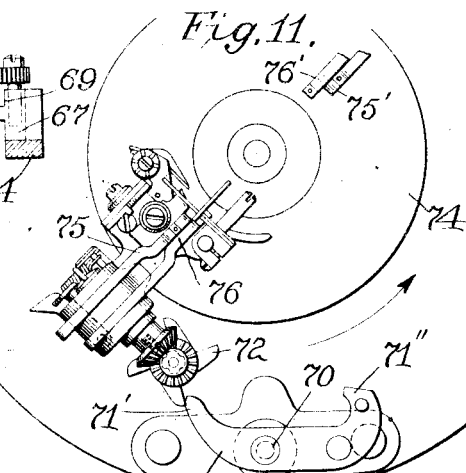

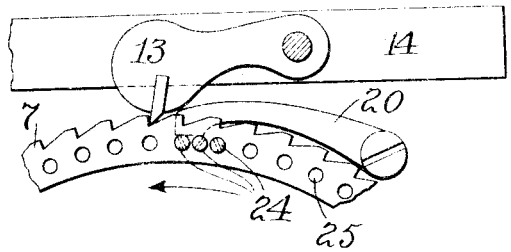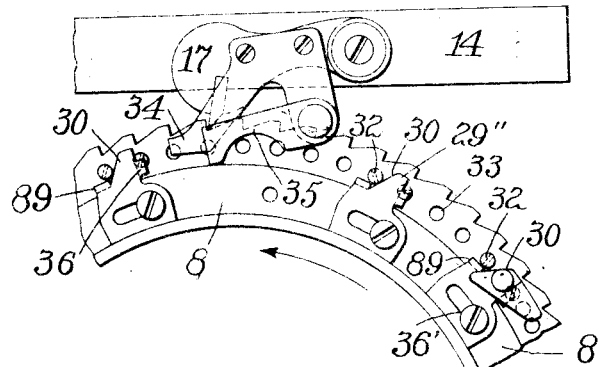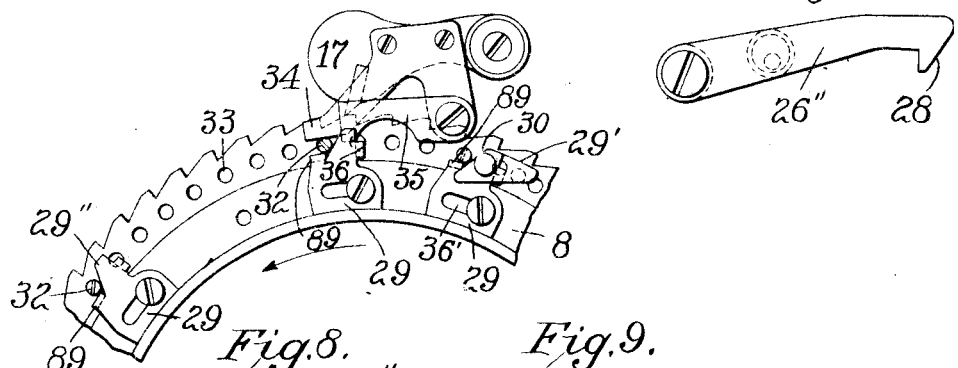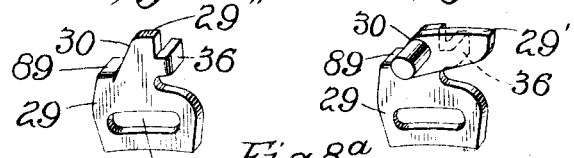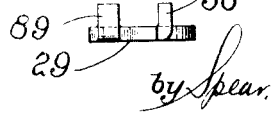

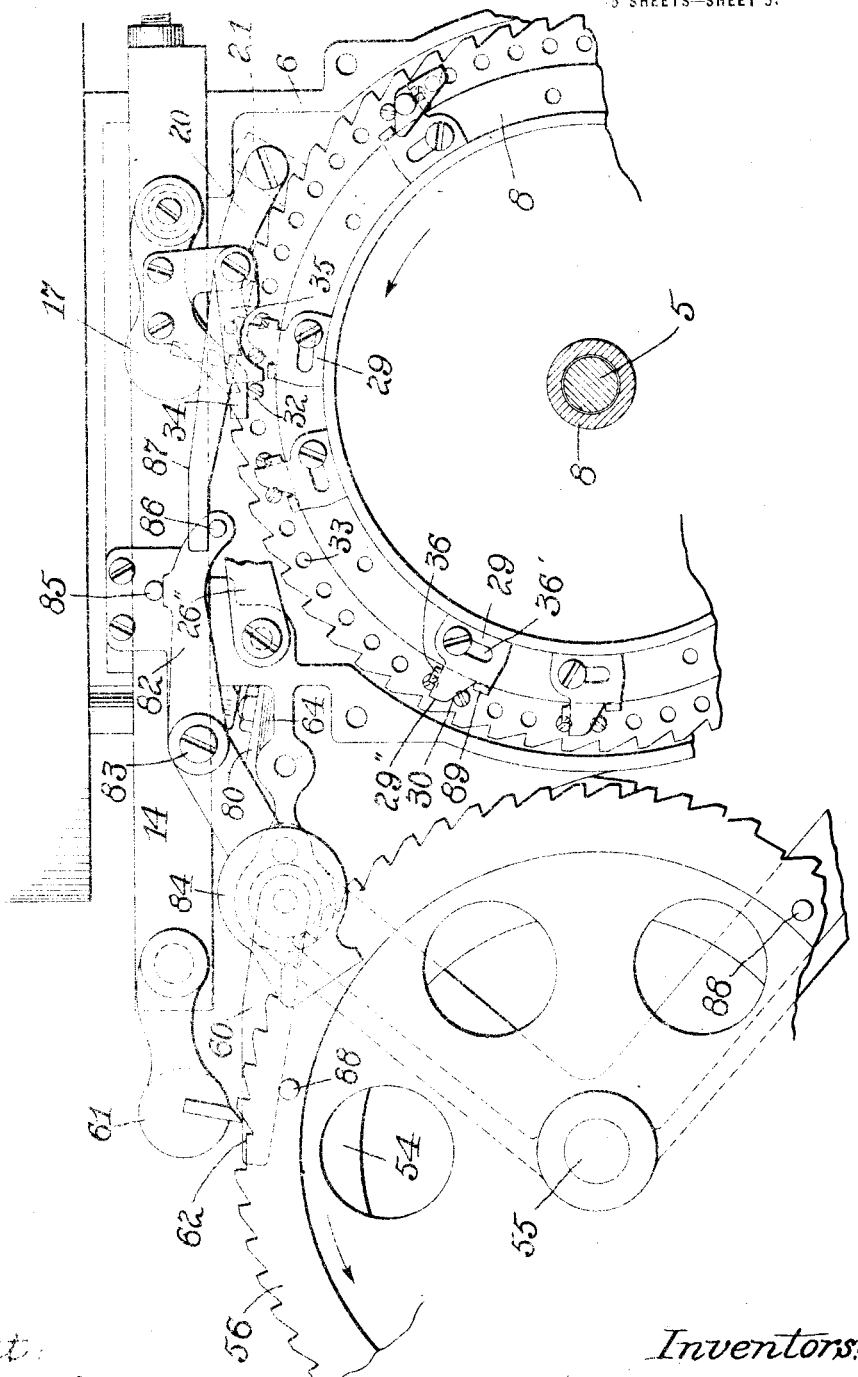

UNITED STATES PATENT OFFICE.

FRANK B. WILDMAN AND GEORGE L. BALLARD, OF NORRISTOWN, PENNSYLVANIA, ASSIGNORS TO WILDMAN MFG. CO., A CORPORATION OF PENNSYLVANIA.

PATTERN MECHANISM FOR KNITTING-MACHINES.

1,172,090. Specification of Letters Patent. Patented Feb. 15, 1916.

Application filed June 4, 1913. Serial No. 771,752.

*To all whom it may concern:*

Be it known that we, FRANK B. WILDMAN and GEORGE L. BALLARD, a citizen of the United States and a subject of the King of Great Britain, respectively, residing at Norristown, Pennsylvania, have invented certain new and useful Improvements in Pattern Mechanism for Knitting-Machines, of which the following is a specification.

Our present invention relates to the form of pattern mechanism disclosed in Letters Patent of the United States #1,065,487, June 24th, 1913, and #1,106,763, August 11, 1914. In the latter patent we describe a repeating pattern wheel. This wheel is employed in addition to a main pattern wheel, the said repeating pattern wheel being started at predetermined times by the main pattern wheel, and throwing itself out of operation automatically when it has performed a prescribed cycle of operations, after which it remains at rest until the pattern is to be repeated, when it is again thrown into operation by the main pattern wheel.

By our present improvements we make the pattern mechanism inter-controlled, or in other words the main pattern mechanism controls the starting of the repeating pattern mechanism, and this last mentioned mechanism in turn controls the starting or timing of the main pattern mechanism when it (the repeating mechanism) has performed its cycle of operations or a predetermined movement, as a result of which inter-control the two pattern mechanisms are kept in time to produce the changes in the pattern in predetermined order.

Figure 1:
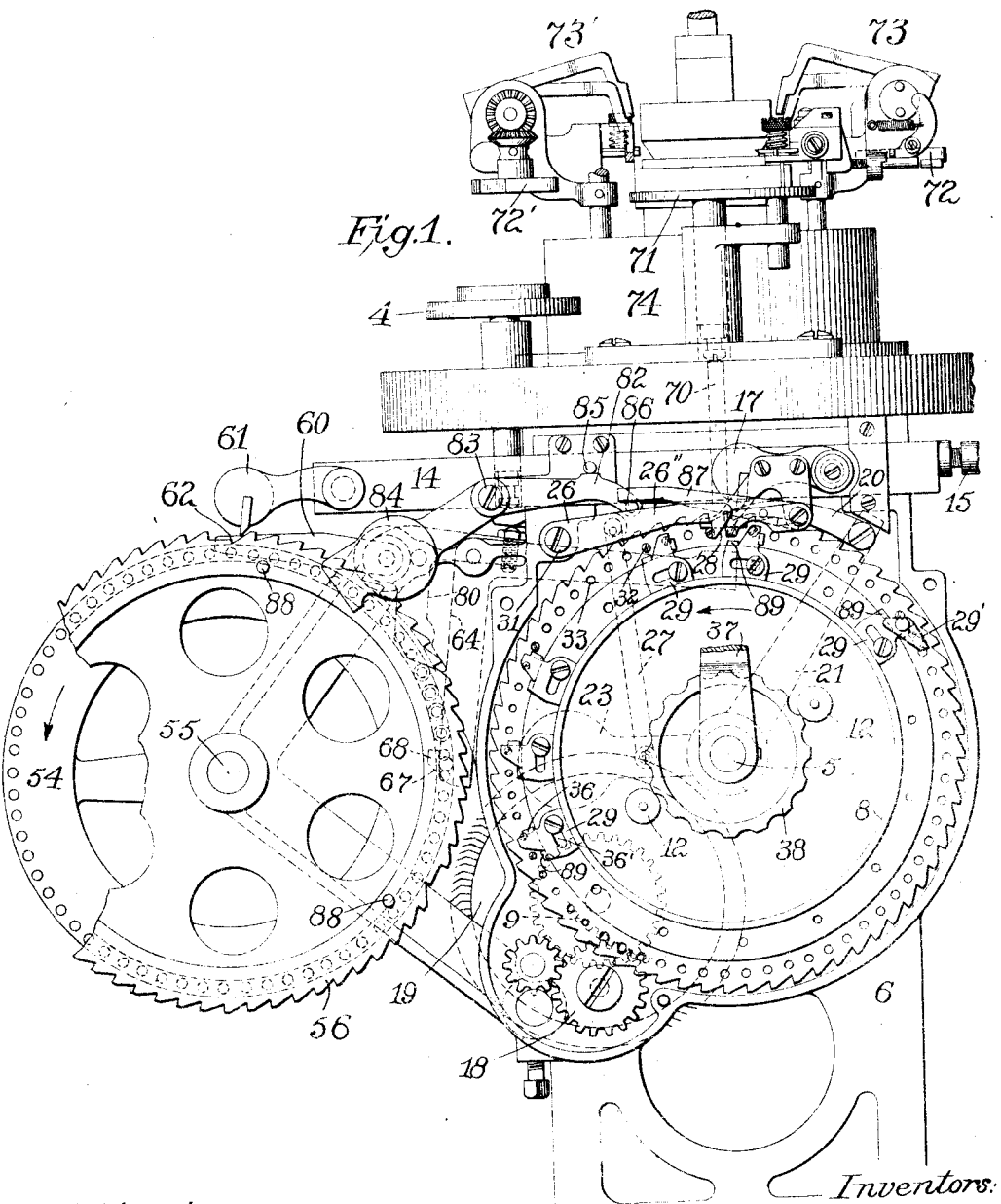
Figure 3:
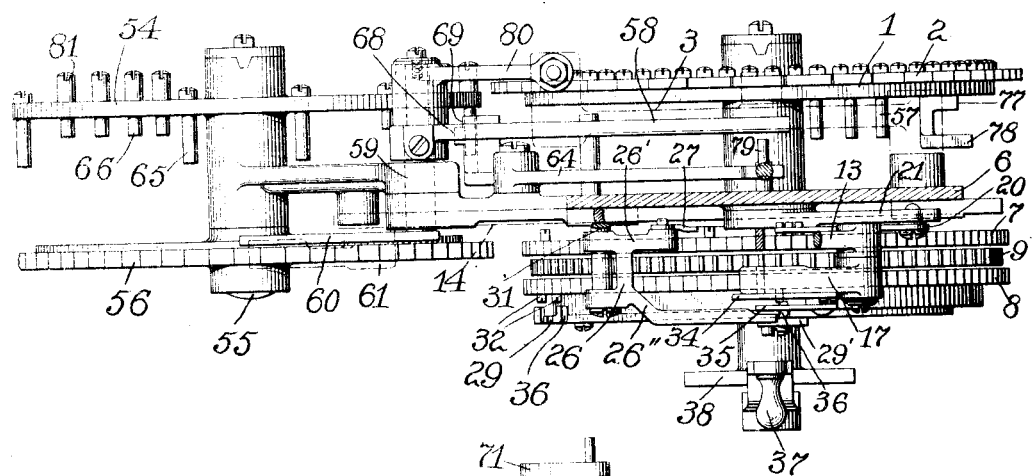
Figure 4:
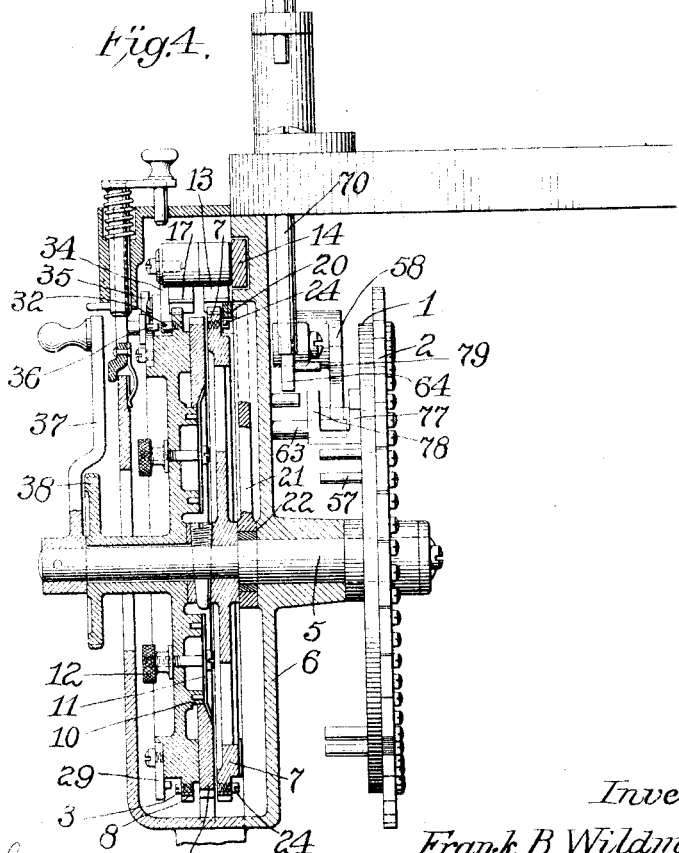

In the accompanying drawings Figure 1 is a side view of a pattern mechanism embodying our invention; Fig. 2 is a side view like the lower portion of Fig. 1 with some portions broken away to show the other members of the mechanism; Fig. 2ª is a view of a detail; Fig. 3 is a plan view of the main and repeating pattern wheel and associated mechanism; Fig. 4 is a vertical sectional view along the shaft of the main pattern wheel some of the parts being shown in elevation; Figs. 5, 6, 7, 8, 8ª, 9 and 10 are views of details; Fig. 11 is a plan view of part of a knitting head showing the position of the thread changers; Fig. 12 is a plan view of the repeating pattern wheel; Fig. 13 is a side view of part of the pattern mechanism shown in Fig. 1.

In these drawings, 1 is the pattern wheel having pattern blocks 2 to operate a lever 3 pivoted to the frame, and controlling the vertical position of a disk 4 which, when in certain positions, will operate certain levers on the knitting head when brought into contact therewith by the revolution of the knitting head. This pattern wheel is fixed on the shaft 5 suitably journaled in the fixed frame 6. On this shaft is fixed a pattern ratchet 7, and it carries also, though loosely, a measuring ratchet 8, and between these two there is arranged a measuring gear wheel 9, this being mounted on a rim 10 of the measuring ratchet and connected with said ratchet by friction springs 11, the tension of which may be varied by screws 12 mounted in the ratchet, by which construction the measuring ratchet may move independently of the gear, but on the other hand the gear, when moved, will turn the measuring ratchet. The pattern ratchet is moved step by step by a pawl 13, Figs. 5-7, but shown broken away in Fig. 3. This pawl is pivoted to a slide 14 movable in bearings in the frame, and operated by a suitable connection to a moving part of the knitting head, a portion of which connection is shown at 15 in Fig. 1. This moves the slide to the left, while a spring (not shown) moves said slide to the right. The measuring ratchet is operated by a pawl 17 pivoted on the same pin with the pawl 13, and the measuring gear wheel is operated through a train of gears indicated generally at 18 from a wheel or roller 19 covered with card clothing, and which is moved by the fabric as it passes down to the take-up.

The pawl 13 of the pattern ratchet is controlled as to the times it engages and moves said ratchet by a shiftable controller 20, consisting of an arm pivoted on a lever 21, which is mounted on the bearing 22 of the frame, and is provided with a weighted extension 23 tending to keep the lever 21 and the controller at the leftward limit of their movement, as indicated in Figs. 1 and 5. With the parts in this position, and considering the fact that the pawl 13 is at the leftward limit of its throw, it will be seen that when the pawl moves to the right to engage a new tooth on the ratchet, it will ride up on this controller, and will thus be prevented from dropping down into the said tooth, and as long as the parts are in this relation, the pawl will reciprocate idly and will not turn the pattern ratchet, and consequently the pattern wheel will remain at rest. The controller 20 works close alongside the pattern ratchet 7, and the end of the pawl 13 extends over the edge of the pattern ratchet and over the edge of the controller to rest thereon.

The controller is acted upon by pins 24, which are screwed into the holes 25 of the pattern ratchet, there being one of said holes for each ratchet tooth, and the pins being placed therein in such number and relation as the pattern may demand. In the drawing, the pattern ratchet, the pawl and the controller are shown at the starting point, i. e. at that point where the pattern is to be started, the said controller now being raised and a group of three of the pins 24 being in position to act upon the controller.

For retracting the controller to allow the pattern ratchet pawl to engage the pattern ratchet and turn the pattern wheel, we employ a double armed lever 26 pivoted to the fixed frame of the machine, one arm 26' of which is connected by a link 27 with the weighted arm 23 of lever 21, and the other arm 26" of which has a beveled end 28 to be acted on by controlling blocks 29 fixed on the measuring ratchet, and having inclined or cam shaped surfaces 30 to act on the beveled end of the said lever arm 26" to lift the same, and thus through the link 27 and lever 21 to retract the controller 20 so that, in the next movement of the pawl 13 to the right, it will engage the pattern ratchet and turn the same. This lever 26 is pivoted to the frame at 31, its pivot pin, however, being broken away in Fig. 3.

It will be noticed that one of the controller blocks or segments is different from the others in that it is provided with an extension 29'. This segment is for starting the pattern and only when this segment comes to work upon the lever arm 26" can the pattern be started by the starting of the pattern ratchet from the position of Fig. 5, for it will be noticed that with the arrangement of the group of three pins it requires the presence of the extension 29' of the controlling segment to hold the operating lever 26" raised, and the controller 20 retracted during a sufficient length of time to allow the pattern ratchet pawl to act. The throw of the controller 20 caused by any of the segments is within the limits of the three pins 24 shown under the controller in Fig. 5, and when the controller is thrown back through the operation of the long segment 29', it will be still held up by these pins, but it will be retained in its rearward position a sufficient length of time for the operation of the pattern ratchet pawl. This will not be the case, however, if the parts should get out of time and one of the other controlling segments should come around against the lever 26" when the pattern ratchet is in the position shown ready to start the pattern. Should such out of time action occur by one of the other segments coming into play against the lever 26", the controller 20 would be retracted to its full limit, but it would immediately return to its forward position and prevent the pattern ratchet pawl from engaging the pattern ratchet, because this controlling segment, having no extension such as 29', would allow the lever arm 26" to drop down at once after being lifted by the end of the lever riding over the short bearing surface 29" at the top of the segment. The extent of bearing surface afforded by the group of three pins at the starting point will hold the controller up, so that, with the short segment, the controller will simply move back and then immediately return to its controlling position to prevent the pawl 13 from engaging the ratchet, whereas with the starting segment having the extension it will be held back long enough to allow the pattern ratchet pawl to do its work. It will thus be seen that the group of three pins on the pattern ratchet coöperate with the special starting segment having the extension to start the pattern, and should the measuring ratchet become out of time in relation to the pattern ratchet, no movement of the latter will take place until, in the movement of the measuring ratchet, the proper timing of the parts is again secured, the controller being on the group of three pins when the starting segment, with its extension 29', works against the lever 26".

The other segments 29 having the short bearing surfaces are intended to coöperate with individually disposed pins 24, which act not as a group, but singly upon the controller 20 to lift it up into controlling position, i. e. the position shown in which it provides an edge for the pattern ratchet pawl to ride on. When the controller therefore is resting on one of these single pins, the pattern-ratchet-pawl will be prevented from engaging its ratchet until one of the short surfaced controlling segments 29 comes around, and lifts the lever arm 26"; this will retract the controller 20 off of the single pin, and said controller will therefore fall and expose the next tooth of the pattern ratchet to be engaged by the pawl 13, and the said ratchet will be turned, thereby turning the pattern wheel.

The measuring-ratchet is moved in either one of two ways, i. e. it is given a slow measuring movement through the gearing 18 and gear 9 from the fabric impelled wheel 19, and it is given a quick measuring movement when its pawl 17 engages its teeth, the said pawl 17 reciprocating constantly with the slide bar 14.

For controlling the engagement of the measuring pawl with its ratchet, we employ pins 32 screwed into threaded openings 33, one for each ratchet tooth in the face of the measuring ratchet, the said pins being disposed in such places and in such number as the pattern requires. These pins act upon an arm 34 fixed to the measuring ratchet pawl, and by riding thereunder lift said pawl out of engagement with its ratchet, and thus stop the quick measuring movements thereof, the said measuring ratchet then advancing slowly by the measuring gear through the friction connection between them which, as above indicated, will allow the measuring ratchet to be advanced ahead of the measuring gear when the quick movement takes place. The measuring pawl having been lifted from its ratchet by one of the pins 32, the ratchet is moved slowly forward in the direction of the arrow by the gearing, until the arm 34 is about to drop off of the pin, and then the measuring ratchet is given a definite or decided advance movement by a supplemental measuring pawl 35 pivoted to an extension of the arm 34, and engaging a lug 36 on the controlling segment, when the slow measured movement of the ratchet wheel brings this lug into position to be engaged by the supplemental pawl. This lug, as the measuring ratchet is turned, rides under the supplemental pawl, holding it up until the lug passes beyond the front end of the pawl, when the same drops quickly, and upon the next movement to the left the pawl engages the lug and gives a definite movement to the measuring wheel, thus setting it in position to be engaged by the main measuring pawl 17, which then moves the measuring ratchet step by step until the next pin 32 comes beneath the arm 34, and lifts the pawl, thus stopping the quick measuring movement. The pins 32 may be arranged in groups or unbroken series, and we have shown, for instance, two of such pins adjacent one of the controlling segments. These pins determine the starting point of the slow measuring movement, and to some extent the length of said movement. In other words, they determine the approximate length of the slow measured movement, but the exact point at which the slow measuring movement ceases is determined by the position of the controlling segment, the stop or lug on which is engaged by the supplemental pawl 35 to start the quick movement and bring the measuring pawl 17 into action. The controlling segments are adjustable by the screw and slot connection at 36′ by which nicety of adjustment of the lug 36 in relation to the pins 32 may be secured for determining the length of the measuring movements. For turning the pattern wheel independently of the ratchet wheel, a handle is provided at 37 connected rigidly with the shaft 5, and for turning the measuring ratchet by hand we provide a hand wheel 38, these being the usual devices provided for such purpose.

We employ a supplemental or repeating pattern mechanism jointly with the main pattern mechanism above described similar to that disclosed in said Letters Patent #1,106,763, above mentioned, this repeating pattern wheel being controlled in its starting from the main pattern mechanism, and in turn exerting control over the main pattern mechanism to determine the times of its starting when the said repeating pattern wheel comes to rest, or is about to come to rest.

The repeating pattern wheel is shown at 54 on a shaft 55 journaled in the frame, which also carries fixed thereto a repeating pattern ratchet 56. For starting the repeating pattern wheel the main pattern wheel has pins 57 acting on a lever 58 fixed to a shaft 59 journaled in the frame, said shaft having also connected thereto a controlling arm 60 to control the engagement of a pawl 61 with the teeth of the repeating pattern wheel ratchet 56. This pawl is pivotally mounted on the same slide 14 to which the pawl 13 of the main pattern wheel ratchet is pivoted. When the repeating pattern wheel 54 is to be inoperative, the driving pawl 61 rides idly upon the upper edge of the repeating ratchet controller 60. At this time the pawl 61 is working idly back and forth in the space 62 of the repeating pattern ratchet, which space is formed by a low tooth at this point, any desired number of said low teeth being disposed about the repeating ratchet.

When the starting pin 57 on the main pattern wheel strikes the lever 58 of the controller 60, the said controller is depressed, thus allowing the pawl to engage the low tooth in the repeating pattern-wheel-ratchet at 62 and turn the same so that now the regular teeth will be engaged by the pawl and the wheel will be turned step by step until the next low teeth comes around, when the movement of the ratchet and the repeating pattern wheel will cease. After the controller is lowered to allow the pawl to engage the low tooth and one pawling action has taken place, the controller can rise, but it does not rise high enough to lift the pawl above the plane of the regular teeth, which are now acted on by the pawl to move the ratchet wheel, together with the pattern wheel 54, step by step. The rise of the controller is limited by a pin 63 on the frame upon which the controller lever rests.

During the movement of the repeating-pattern-wheel, pins thereon act in succession upon a laterally extending portion of a striper lever 64, that is to say, the pins in one group between one low tooth and the next are brought into action and contact in succession with the lever 64, and operate it until the repeating-pattern-wheel throws itself out or comes to rest. These pins, as shown in Figs. 3 and 12, are long and short, the long pins 65 being adapted to give a greater movement to the lever 64 than the short pins 66, owing to the fact, as shown in Fig. 12, that the long pins, in traveling, maintain contact with the beveled end 67 of the lever all the way to the end of the stud 68, Figs. 2 and 12 pushing the said lever to the right its full distance, but the short pins move the lever only part of the distance because they ride off of the lever at the shoulder 69 instead of at the end of the stud 68, not being long enough to reach said stud. Now, when the lever is moved by one of the long pins acting on one end, its other end will be raised, lifting the pin 70 connected with the claw or controller plate 71, Figs. 1, 4 and 11, so that said claw or controller plate will be raised into the path of the star wheel 72 of the right hand striper attachment shown generally in Fig. 1 at 73, which attachment is mounted to rotate with the cam box 74. Having operated this star wheel, the striper lever 64, together with the claw 71, drops back again to the normal position shown, that is, after the long pin has passed the laterally extending foot of the lever 64. A short pin operating the striper lever will raise the claw 71 so as to be in the plane of rotation of the star wheel 72' of the other striper shown generally at 73', and which is arranged diametrically opposite the striper attachment 73 first mentioned, so that a change in the threads controlled by this striper may be effected. The star wheels are at different elevations, and hence when the claw is lifted by the long pin it will be struck by the high star wheel, and when lifted by the short pin it will be raised to the plane of the low star wheel. These stripers are substantially of the form shown in Letters Patent of the United States of Hipwell, #815,167, March 13, 1906, each having a pair of guiding arms 75, 76, 75', 76' for the yarns, one arm of each being down to feed its yarn and the other arm of each being up to hold its yarn from being fed. The slide 14 reciprocates once for every revolution of the machine, and by arranging the pins in the repeating pattern wheel, the desired striped effect can be secured, the times when the slide is effective in moving the pattern repeating wheel being controlled by the measuring mechanism of the main pattern wheel driven from the fabric or card wheel 19 through the gearing 18. The claw is in the form of a flat plate having the front and rear projections 71' and 71" to operate, as just pointed out, twice against the star wheel as the same is passing it. It is carried by a post, and extends in a horizontal plane therefrom so that the star wheel which is not to be operated thereby may pass either over or under the plate, as the case may be.

In addition to operating the stripers from the repeating-pattern-wheel in the desired order, one of them is controlled by cam blocks on the main pattern wheel 1, two of which are shown at 77. These blocks are of channel form adapted to freely pass the controller lever 58 without operating it, but the outer arm or portion 78 of the block is adapted to strike a pin 79 on the striper lever 64, and operate it independently of the repeating-pattern-wheel, and while the same is at rest. By this the claw is raised to the level of the low star wheel, so that this will be made to transpose its yarns, placing one in feeding position and drawing the other out, and if the one fed in corresponds in color with the one fed in by the other striper, a solid color fabric may be knit, and this is done when it is desired to knit the neck band of a tie in solid color. The repeating-pattern-wheel makes the stripes in the ends of the tie by bringing into action in proper succession one striper and then the other, but as just stated the main pattern wheel effects the change in one of the stripers to make the solid color for the neck band. The main parts of the tie are knit in accordion stitch while the neck band is knit plain rib.

From the above it will be seen that the repeating wheel can not get out of time. It permits repetitions of the pattern to be made indefinitely. When the repeating pattern wheel is started by the pin on the main pattern wheel, it completes a full action and then it is thrown out by the raising of the controller 60 actuated from the main pattern wheel, this controller, when raised, keeping the pawl 61 from engaging the deep notch in the repeat wheel.

As shown in Figs. 1, 2 and 3, an additional or supplementary tucking lever 80 is employed, this being pivoted on an extension of the pivot of the controller 60, said lever having one arm provided with an adjusting bearing screw engaging the under side of the main tucking lever 3, and having a depending arm to be operated by long headed screws or pins 81 carried by the repeating or secondary pattern wheel 54, these long headed pins or screws projecting on the opposite side of the pattern wheel from that where the portions 65 and 66 of the pins are located for operating the lever 64. The main tucking lever 3 is operated by suitable plates or pattern members mounted on the main pattern wheel 1, and this tucking lever adjusts vertically a disk 4 which is well known in the Wildman type of machine, and is employed for operating certain contact levers as they are brought thereto in the revolution of the machine for making changes in the fabric such, for instance, as a tuck stitch, the disk being raised and lowered into and out of the plane of these contact devices carried by the rotary head. The short screws or pins on the secondary pattern wheel 54 do not operate the secondary lever, and from the above construction it will be seen that one set of pins may be used for operating the striping mechanism and another set of pins may be used for operating the tucking lever, these operations being performed without interference one with the other. One object of this secondary tucking lever is to change the pattern from plain stitch to tuck stitch or the reverse, and always have the changes of stitch in a certain relation to the striping changes. The arrangement of the main and secondary tucking levers may be changed from that shown, or in other words, other arrangements of these levers may be employed so that both may act upon the disk 4.

In our present improvement as above stated, we make the main and repeating pattern mechanisms inter-controlled. We have disclosed by the foregoing description how the main pattern mechanism starts the repeating or supplemental pattern mechanism, and will now describe how the repeating or supplemental pattern mechanism exercises control over the main pattern mechanism. For this purpose a lever 82 is pivoted to the frame at 83. It is weighted at 84 and rests against a pin 85 on the frame. It has a pin 86 upon which rests an arm 87 attached to the supplemental measuring pawl 35 of the measuring ratchet to hold this up so as not to engage the low lugs 89 of segments 29 on the measuring ratchet wheel until the said weighted lever is operated by a pin 88 on the ratchet 56 of the repeating or supplemental pattern mechanism. There is one of the pins 88 for each section or division of the repeating pattern wheel.

As above set forth, the repeating pattern wheel is started by the lever 58 depressing the controller 60 when the pin 57 on the main pattern wheel lifts said lever and when the pin 57 passes from under the lever 58 the controller rises far enough to prevent the pawl from engaging the low tooth 62 but not high enough to prevent the pawl from engaging the regular teeth so that the pawl will continue to turn the striping or repeating pattern wheel until the low tooth comes around. The time at which the pawl 35 of the measuring ratchet falls and engages a low tooth 89 on one of the segments or blocks 29 is controlled by the pin 88 on the repeating or striping pattern wheel operating the lever 82, the action of this pawl, therefore, bringing the measuring wheel into position so that on the next forward movement of the pawl it will engage the other (high) tooth 36 of the block or segment 29, move the same, together with the measuring wheel, and the incline of the segment 29 will thus operate the lever 26″, retract the controller 20, whereupon the pattern ratchet pawl 13 will engage the pattern ratchet and the pattern wheel 1 will be started. It will thus be seen that the repeating wheel is started from the main pattern wheel through the pin and lever 57, 58, and that the said repeating pattern mechanism, in turn acting through the pin 88 and lever 82, times the starting of the main pattern wheel by timing the fabric-length measuring member 8 and the starting of the main pattern wheel effects the stopping of the course measuring wheel 56 and the pattern member 54.

The engagement of the supplementary measuring pawl 35 with the low tooth of the segment 29 may take place at any point within the limit of the pawl's stroke, according to the position the segment may have assumed due to the slow measuring movement of the measuring wheel. As a result of the first pawling movement the second tooth on the cam block or segment is brought into position to be engaged by the supplemental pawl 35 at a definite point in the next stroke thereof for causing the retraction of the controller 20 and the starting of the main pattern wheel in proper relation to the repeating pattern mechanism.

The lever 82, considered in one respect, is a timing device for the main and supplemental or repeating pattern mechanism, for by its action, when operated by the pin 88 on the ratchet 54 of the repeating pattern mechanism, it first times the starting of the main pattern mechanism through the supplemental pawl 35 thereof, and as a result of the starting of the main pattern wheel the stopping of the supplemental or repeating pattern mechanism takes place due to the pin 57 being removed from the lever 58, and the consequent lifting of the supplemental controller 60 and removal of the pawl 61 from action. The main and repeating pattern mechanism are thus inter-controlled, each exerting a control over the operation of the other, and in this way they are kept in time to produce the changes in the pattern in predetermined order. The main pattern wheel 1 is at rest while the supplemental pattern wheel is rotating, and during this time the lever 58 is resting on the pin 57 and the supplemental pattern wheel is moving. The pin 57 will not release the lever 58 for stopping the repeating pattern wheel, however, until the starting piece 29 with the high and low lugs 36, 89, comes around, due to the slow measuring movement of the ratchet 8, and brings the low lug 89 to the pawl 35 and until said pawl is allowed to fall by the timing lever 82. When this occurs, the first action of the pawl 35 will be on the low lug 89 to bring the measuring ratchet into proper time, and the next action will be against the high lug 36, which will bring the main measuring pawl 17 into action and cause the withdrawal of the controller 20 and consequently the movement of the main pattern wheel by the pawl 13.

Regarding the above statement that the main pattern wheel is at rest while the repeating or striping wheel is moving, it may be also pointed out that when the repeating or striping wheel is to be operated, the starting pin 57 on the main pattern wheel is so placed that the main pattern wheel starts the striping wheel just before the main pattern wheel stops. The main pattern wheel cannot start until the striping wheel has finished its travel. Consequently, since the main pattern wheel starts the striping wheel just before the main pattern wheel stops, and since the main pattern wheel cannot start until the striping wheel finishes its travel, therefore the main pattern wheel must rest during the operation of the striping wheel.

After the lever 82 has been operated, it returns to the position shown in Fig. 1, because the pin 88 has passed from engagement with it, and the supplemental pawl 35 will thus be held in position to engage only the high lug 36 of the segment 29 of the measuring ratchet.

As to maintaining the relative timing of the two wheels it may be said that: Supposing that the measuring device and the striping device kept in perfect time, and suppose that the striping wheel and the main pattern wheel were to be operated in immediate succession, then just as soon as the striping wheel stopped, a high starting lug 36 on the measuring wheel would start the pattern wheel, for the lug would be placed to do so. But, since the mechanisms do not keep perfect time, the measuring wheel is adjusted to lag behind the striping wheel, but not more than the travel of the timing pawl, so that when the striping wheel has finished its travel a low starting lug 89 will be within reach of the timing pawl 35. The distance which the timing pawl has to push the low starting lug 89 is the distance necessary to perfect the timing. The high and low lugs 36—89 can be placed on all the blocks.

From the foregoing it will be seen that the invention involves two-pattern mechanism, one being operated from the fabric roller and which we designate as the main pattern mechanism, this measuring the fabric by actual length and the other which we designate as the supplemental pattern mechanism which is started from the main pattern mechanism and which measures the fabric by courses or multiples of courses. These two measurements will not fully accord and the differences between them would appear as a defect in the last part of the knitted fabric were not some provision made to render the differences negligible. For instance, suppose a top is to be knitted with a series of stripes these would be measured by courses and the other parts of the top would be measured by length, and from the beginning of the article, so that the difference between the two measurements would come out of the terminal section of the article. By our arrangement we distribute this difference throughout the fabric by restarting the actual measurement or the length measurement after each course measurement, instead of making a fixed actual measurement over all. One important feature of novelty in our invention is that we get not only the starting of the course measuring member from the fabric-length-measuring member, but we secure the correction of the timing of the last named member from the first mentioned member, and further we secure course-measurement termination by the length-measuring member.

The length-measuring member, i. e., the wheel 8 in the embodiment illustrated, begins the measurement, and at the proper time starts the course measurement device, i. e., the wheel 56. So far the action is not new over the prior art. The course-measuring device, however, at each proper stopping place, sets in action what may be termed feeler means, consisting in the example shown of the parts 82, 87, 35, which feels the length-measuring device to determine whether or not the length-measuring device will now call for or is about ready to call for the stopping of the course measuring device. If the length-measuring wheel is in position to require or call for the cessation of course measurement, but is not in exact time, that is, with a high lug 36 in position to be engaged by the time correcting pawl 35, the low lug 89 of the controller block 29 will be within reach or range of the feeler 35, which will engage that lug and move the measuring wheel up into position to start the main pattern wheel in proper time relative to the cessation of course measurement, and through the main pattern wheel to stop the course-measuring device at the end of the repeat. This stopping of the course measurement is due to the pin 57 on the main pattern wheel being removed from the lever 58, allowing the controller 60 to rise and hold the pawl 61 out of the deep notch. If the length measuring device or wheel were not corrected as to time of operation, it would move the main pattern wheel out of time, which movement would stop the repeating pattern wheel out of time. By the action above described not only is the repeating pattern wheel 54 stopped, but the fabric or length measuring wheel is adjusted to restart substantially where the repeating measurement is discontinued.

The repeating wheel may make any number of repetitions involving whole and fractional revolutions of the repeating wheel. It will be seen that the repeating wheel 56 has a multiple of sections each representing a given number of courses, and that the stopping of the course measurement may take place within one of these sections or within a portion or fraction of a multiple of a given number of courses.

We claim as our invention:—

1. In combination in pattern mechanism for knitting machines, a main pattern member, measuring the fabric by actual length, a supplemental pattern member measuring the fabric by courses, means for operating the length pattern member during intermittent periods, means controlled by the course pattern member for correcting the time of starting of the length pattern member at the termination of each course measurement, and means controlled by the length pattern member when started for stopping the course pattern member, said length measuring pattern member controlling also the starting of the course measuring pattern member, substantially as described.

2. In combination a pattern member measuring the fabric by length, a course measuring member measuring the fabric by courses, said members operating in alternation, means for driving said members, means for correcting the time of starting of the length measuring member from the course measuring member at the end of each course measurement, and means for controlling the stopping of the course measuring member from the corrected length measuring member when the latter starts, substantially as described.

3. In combination a pattern member measuring the fabric by length, a course measuring member measuring the fabric by courses, said members operating in alternation, means for driving said members, means for correcting the time of starting of the length measuring member from the course measuring member at the end of each course measurement, and means for controlling the stopping of the course measuring member from the corrected length measuring member when the latter starts, and for subsequently controlling the starting of the course measuring member, substantially as described.

4. In combination in pattern mechanism for knitting machines, a main pattern member measuring the fabric by actual length, a supplemental pattern member measuring the fabric by courses, a measuring member, driving means for the main pattern mechanism controlled by the said measuring member, driving means for the measuring member itself including connections to the fabric roll, and a pawl, means controlled by the course measuring member to correct the timing of the measuring wheel and its driving pawl, and means for stopping the course measuring member to conform to the corrected timing of the measuring wheel and its pawl, substantially as described.

5. In combination in pattern mechanism for knitting machines, a main pattern mechanism measuring the fabric by actual length, a supplemental pattern mechanism measuring the fabric by courses, connections operated by the main pattern mechanism for both starting and stopping the supplemental pattern mechanism, and connections operated by the supplemental pattern mechanism for correcting the time of starting of the main pattern mechanism which thereupon, through the connections first mentioned, stops the supplemental pattern mechanism, substantially as described.

6. In combination in pattern mechanism for knitting machines, a main pattern wheel, a measuring wheel with means operated by the passage of the fabric for giving the same a slow measuring movement for length, and a pawl for giving the same a rapid measuring movement, connections controlled by the movement of the measuring wheel for starting the main pattern wheel, a supplemental pattern mechanism, measuring the fabric by courses, connections controlled by the main pattern wheel for starting the supplemental pattern mechanism, and connections controlled by the supplemental pattern mechanism for correcting the time of operation of the pawl upon the measuring wheel to thereby correct the time of the starting of the main pattern wheel in prescribed relation with the stopping of the supplemental pattern mechanism, substantially as described.

7. In combination in pattern mechanism for knitting machines, a main pattern wheel, a pattern ratchet, a pawl for operating the same, a measuring ratchet wheel, means for giving it a slow measuring movement for length by the passage of the fabric, a pawl for giving it a quick measuring movement, a controller for the pattern ratchet pawl, contact pieces on the measuring ratchet for adjusting the controller, a supplemental pattern wheel and ratchet, a pawl for operating the ratchet and measuring the fabric by courses, a controller for said pawl with means for adjusting the same from the main pattern wheel, and a connection for correcting the time of operation of the measuring ratchet pawl, said connection being controlled by the supplemental pattern mechanism, and said main pattern wheel, through the said controller, stopping the supplemental pattern wheel according to said corrected timing of the main pattern wheel, substantially as described.

8. In combination in pattern mechanism for knitting machines, a main pattern wheel, a measuring wheel operated for length by the passage of the fabric, connections between the measuring wheel and the main pattern wheel for operating the latter, a main and supplemental pawl for operating the measuring wheel, operating means for said pawls, means for holding the main pawl out of operation until the measuring wheel has been moved into a certain position by the supplemental pawl, a supplemental pattern mechanism, measuring the fabric by courses, connections controlled by the main pattern wheel for starting the supplemental pattern mechanism, and a connection between the supplemental pattern mechanism and the supplemental pawl of the measuring wheel for correcting the time of operation of the wheel in relation to the supplemental pattern mechanism to thereby control the starting of the main pattern wheel, substantially as described.

9. In combination in a pattern mechanism for knitting machines, a main pattern wheel, a measuring wheel operated for length by the passage of the fabric, connections between the measuring wheel and the main pattern wheel for operating the latter, a main and supplemental pawl for operating the measuring wheel, operating means for said pawls, means for holding the main pawl out of operation until the measuring wheel has been moved into a certain position by the supplemental pawl, a supplemental pattern mechanism, measuring the fabric by courses, connections controlled by the main pattern wheel for starting the supplemental pattern mechanism, and a connection between the supplemental pattern mechanism and the supplemental pawl of the measuring wheel for correcting the time of operation of the measuring wheel in relation to the supplemental pattern mechanism to thereby control the starting of the main pattern wheel, said measuring wheel having ratchet teeth to be engaged by the main pawl and high and low lugs to be engaged by the supplemental pawl, the said connection holding the supplemental pawl out of engagement with the low lugs normally, but allowing the said pawl to fall into line with the said low lugs when the supplemental pattern mechanism has performed a predetermined movement, the said pawl, when in normal position, being adapted to operate against the high lugs, substantially as described.

10. In combination in pattern mechanism for knitting machines, a main pattern wheel, a measuring wheel having ratchet teeth and also high and low lugs, said measuring wheel being operated from the passage of the fabric, a main pawl to engage the ratchet teeth, means to hold the pawl normally out of engagement with the ratchet teeth, a supplemental pawl to engage the high and low lugs, and to thereby bring the main pawl into action, connections controlled by the measuring wheel for starting the main pattern wheel, a supplemental pattern mechanism measuring by courses, connections controlled by the main pattern wheel for starting the supplemental pattern mechanism, and also for stopping the supplemental pattern mechanism, and connections controlled by the supplemental pattern mechanism for holding the supplemental pawl normally out of line with the low lugs, said connections permitting the pawl, when in normal position, to work in line with the high lugs, substantially as described.

11. In combination a main pattern wheel measuring by length of fabric, pawl and ratchet measuring devices with connections for controlling the starting of the main pattern wheel, a supplemental pattern mechanism measuring by courses, connections controlled by the main pattern wheel for starting the supplemental pattern mechanism, means to correct the timing of the engagement of the pawl and measuring ratchet, lever to control said correcting means, and means on the supplemental pattern mechanism for controlling said lever, substantially as described.

12. In combination a main pattern wheel, a pattern ratchet in fixed connection therewith, a pawl for operating the said pattern ratchet, a slide for operating the pawl, a loosely mounted measuring ratchet, means for giving said ratchet a slow measuring movement, a pawl mounted on the slide for giving the measuring ratchet a quick measuring movement, pins on the measuring ratchet for holding the measuring pawl normally out of action, a supplemental measuring pawl reciprocating in unison with the main pawl, contact pieces on the measuring ratchet having high and low lugs to be engaged by the supplemental pawl, said contact pieces having inclines, a controller for the pattern ratchet pawl, connections operated by the said inclines for adjusting the controller, pins on the pattern ratchet for also adjusting the controller, a supplemental pattern wheel, a ratchet wheel in fixed connection therewith having high and low lugs, a pawl connected with the slide for operating the supplemental pattern ratchet, a controller for the supplemental pattern ratchet pawl, connections controlled by the main pattern wheel for adjusting the supplemental controller, a lever mounted on the fixed frame for holding the supplemental measuring pawl up out of line with the low lugs, but permitting it to operate against the high lugs of the contact pieces, and means for operating the said lever from the supplemental pattern mechanism, substantially as described.

A pattern mechanism comprising a main pattern mechanism measuring the fabric by actual length, a supplemental pattern mechanism measuring the fabric by courses, means for controlling the starting and stopping of the supplemental pattern mechanism from the main pattern mechanism and means for restarting and timing the main pattern mechanism at the end of each course measuring action, said last mentioned means being controlled from the supplemental pattern mechanism, substantially as described.

14. In combination with a knitting machine having pattern changing devices mounted thereon, a pattern wheel having laterally projecting long and short pins, and a lever having long and short contacting surfaces for the said pins for operating the lever to different degrees, said lever controlling the pattern changing devices, substantially as described.

15. In combination in pattern mechanism for knitting machines, a pattern mechanism measuring the fabric by its actual length, a second pattern mechanism measuring the fabric by courses and means for correcting the timing of the length measuring mechanism to compensate for the variations due to course measurement, said correcting means operating at the end of the course measurement, and means for stopping the course measurement according to the corrected timing of the length measurement, substantially as described.

In testimony whereof, we affix our signatures in presence of two witnesses.

FRANK B. WILDMAN.
GEORGE L. BALLARD.

Witnesses:
OWEN BALLARD,
EDITH C. FRICK.